United States Patent Office 3,420,882
Patented Jan. 7, 1969

3,420,882
BENZENESULFONYL UREAS
Karl Muth and Walter Aumüller, Kelkheim, Taunus, and Rudi Weyer and Helmut Weber, Frankfurt am Main, Germany, assignors to Farbwerke Hoechst Aktiengesellschaft vormals Meister Lucius and Brüning, Frankfurt am Main, Germany, a corporation of Germany
No Drawing. Filed Mar. 22, 1965, Ser. No. 441,880
Claims priority, application Germany, Feb. 2, 1964, F 42,379
U.S. Cl. 260—553
Int. Cl. C07c 143/78
10 Claims

ABSTRACT OF THE DISCLOSURE

Orally administrable benzenesulfonyl urea derivatives having hypoglycemic activity and the formula

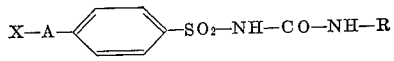

in which
X is chlorine or bromine,
A is an alkylene of from 1 to 3 carbon atoms,
R is a cycloalkyl of from 5 to 8 carbon atoms, cyclohexyl substituted by an alkyl of from 1 to 3 carbon atoms or cyclohexylalkyl having from 1 to 2 carbon atoms in the alkylene chain.

---

It has been known that certain benzenesulfonyl-urea derivatives possess hypoglycemic properties and that they are, therefore, suitable as orally administrable antidiabetics.

In particular, N - (4 - amino - benzenesulfonyl)-N'-n-butyl-urea and N-(4-methyl-benzenesulfonyl)-N'-n-butyl-urea have gained considerable importance in diabetes therapy owing to their good hypoglycemic activity and tolerance.

Now, we have found that also compounds of the general formula

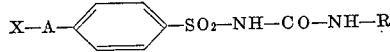

in which X, A and R have the meanings given hereunder, and their salts are valuable medicaments which are distinguished by the fact that they are capable of exerting a strong and, in particular, long lasting lowering action on the blood sugar level.

Thus, the present invention provides benzenesulfonyl-ureas of the general formula

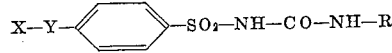

in which
X represents chlorine or bromine,
A represents a straight-chain or branched hydrocarbon radical of 1–3 carbon atoms,
R represents cycloalkyl of from 5–8 carbon atoms, alkyl-cyclohexyl the alkyl group having from 1–3 carbon atoms or cyclohexylalkyl the alkylene group having from 1–2 carbon atoms.

The present invention also provides processes for the preparation of the benzenesulfonyl-ureas of the invention. The following methods which are generally known for the preparation of these types of compounds may be employed, for example:

(a) X—A-substituted benzenesulfonyl-isocyanates, benzenesulfonyl-carbamic acid esters, benzenesulfonyl-thiocarbamic acid esters, benzenesulfonyl-carbamic acid halides or benzenesulfonyl-ureas are reacted with amines of the formula H₂N—R, or if desired with salts of such amines, or (b) X—A-substituted benzenesulfonamides or their salts are reacted with R-substituted isocyanates, carbamic acid esters, thiocarbamic acid esters, carbamic acid halides or ureas, or (c) correspondingly substituted benzenesulfonyl - isourea-ethers, benzenesulfonyl-isothiourea-ethers or benzenesulfonyl-parabanic acids are hydrolysed, or (d) in correspondingly substituted benzenesulfonyl-thio-ureas, the sulfur atom is replaced by an oxygen atom, or (e) correspondingly substituted benzenesulfenyl-ureas or benzenesulfinyl-ureas are oxidized, and, if desired, the products obtained are treated with physiologically tolerated alkaline agents.

Instead of the benzenesulfonyl-isocyanates substituted by the group X—A—, there may also be used compounds which form such benzenesulfonyl-isocyanates in the course of the reaction or which react as such benzenesulfonyl-isocyanates. Apart from the compounds which are mentioned herein later on there may be used, for example, the reaction products of benzenesulfonyl-isocyanates with acid amides such as caprolactam or butyrolactam, furthermore with weakly basic amines such as carbazoles. In the same manner R-substituted isocyanates used as starting materials can be replaced by compounds which form such isocyanates in the course of the reaction or which react as such isocyanates.

The benzenesulfonyl-carbamic acid esters or the corresponding benzenesulfonyl-monothiocarbamic acid esters and the R-substituted carbamic acid esters or thiocarbamic acid esters which are suitable as starting compounds are preferably derived from low molecular weight alkanols or from phenol.

As carbamic acid halides the chlorides are advantageously used.

The benzenesulfonyl-ureas which may be used as starting material for the preparation of the products of the present invention may be unsubstituted or mono- or di-substituted by other alkyl groups or aryl groups at the terminal nitrogen atom. Instead of benzenesulfonyl-ureas substituted in such a manner, there can also be used corresponding N-benzenesulfonyl-N'-acyl-ureas or bis-(benzenesulfonyl)-ureas. It is, for example, possible to treat such bis-(benzenesulfonyl) - ureas or N-benzenesulfonyl-N'-acyl-ureas with amines of the formula R—NH₂ and to heat the salts obtained to elevated temperatures, particularly above 100° C.

It it likewise possible to start from ureas of the formula R—NH—CO—NH₂ or from acylated ureas of the formula R—NH—CO—NH—acyl, in which acyl represents an aliphatic or aromatic acid radical, preferably of low molecular weight, or the nitro group, or from phenyl-ureas of the formula R—NH—CO—NH(C₆H₅) or from diphenyl-ureas of the formula R—NH—CO—N(C₆H₅)₂, in which case the phenyl radicals may be substituted or may be linked with one another either directly or by means of a bridge member such as —CH₂—, —NH—, —S— or —O—, or from N,N'-disubstituted ureas of the formula R—NH—CO—NH—R and to react these with X—A-substituted benzenesulfonamides.

The benzolsulfonyl - isourea - ethers, benzenesulfonyl-isothiourea - ethers or benzenesulfonyl - parabanic acids which may be hydrolysed according to the present invention, may be prepared, for example, by reacting R-substituted isourea-ethers, isothiourea-ethers or parabanic acids with X—A-substituted benzenesulfonyl halides. The hydrolysis is particularly easy when carried out in an alkaline medium, in the case of isourea ethers also in an acid medium.

The replacement of the sulfur atom in benzenesulfonyl-thioureas can be effected, for example, with the aid of oxides or salts or heavy metals or also by the application of oxidizing agents such as hydrogen peroxide, sodium peroxide or nitrous acid.

As regards the reaction conditions, the methods of carrying out the aforesaid processes may, in general, vary within wide limits and can be adapted to each individual case. For example, the reactions can be carried out with the use of solvents, at room temperature or at an elevated temperature.

As starting materials, there may be used compounds containing a benzenesulfonyl radical substituted in p-position by the group X—A—. As the group X—A—, there may be mentioned, for example,

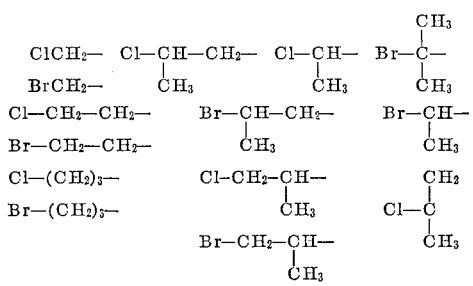

On the other hand, there may be used as starting compounds primary amines such as cyclopentylamine, cyclohexylamine, 4-isopropyl-cyclohexylamine, cycloheptylamine or cyclooctylamine, or compounds which are derived from corresponding primary amines such as urea, carbamic acid esters, carbamic acid halides or thiocarbamic acid esters.

The benzenesulfonyl-urea derivatives obtained according to the present invention are valuable medicaments characterized by a strong and, in particular, long-lasting blood sugar lowering action. Their hypoglycemic action could be determined, for example, in rabbits and dogs by feeding to them the products of the invention in the usual doses and determining the blood sugar values according to the known method of Hagedorn-Jensen over a prolonged period.

The test results are shown in the following table:

|  | Rabbit, 50 mg./kg., lowering after 6 hours, percent | Rabbit, Threshold concentration, (mg./kg.) | Dog, 5 mg./kg. lowering after— | |
|---|---|---|---|---|
|  |  |  | 6 hours, percent | 24 hours, percent |
| N-[4-ω-chloroethyl-benzenesulfonyl]-N'-cyclohexyl-urea | 48 | 2 | 34 | 15 |
| N-[4-ω-chloroethyl-benzenesulfonyl]-N'-4-methyl-cyclohexyl-urea | 35 | 5 |  |  |
| Tolbutamide (for comparison) | 22 | 25 | 12 |  |

As may be seen from the foregoing table, the products of the invention lower the blood sugar level in rabbits, after administration of a dose of 50 mg., by 48% and 35%, thus much more than an equal dose of tolbutamide (22%). They are also active with much smaller doses than tolbutamide (2 and 5 mg./kg., respectively, in contradistinction to 25 mg./kg. with tolbutamide). Finally, 5 mg. administered to a dog after 24 hours still provoke a lowering by 15%, whereas tolbutamide is not active under these conditions.

The present invention also provides pharmaceutical preparations which comprise the benzenesulfonyl-ureas of the present invention or their physiologically tolerable salts in admixture or conjunction with a pharmaceutically suitable carrier.

The benzenesulfonyl-ureas of the present invention are preferably used for the manufacture of orally administrable pharmaceutical preparations showing blood sugar lowering action in the treatment of diabetes mellitus and can be used as such or in the form of their physiologically tolerable salts or in the presence of substances causing the formation of such salts. For the formation of salts there may be used: alkaline agents such as alkali metal hydroxides, alkaline earth metal hydroxides, alkali metal carbonates, alkaline earth metal carbonates, alkali metal bicarbonates, alkaline earth metal bicarbontes.

The pharmaceutical preparations are preferably in the form of tablets containing, in addition to the compounds of the invention, the usual adjuvants and carriers such as talc, starch, lactose, tragacanth or magnesium stearate.

The following examples illustrate the invention but they are not intended to limit it thereto:

EXAMPLE 1

N-(4-ω-chloroethyl-benzenesulfonyl)-N'-cyclopentyl-urea 20 g. of N-(4-ω-chloroethyl-benzenesulfonyl-carbamic acid methyl ester) (melting point 125° C., prepared from 4-ω-chloroethyl-benzenesulfonamide and chloroformic acid methyl ester), 6.2 g. of cyclopentylamine and 100 ml. of dioxane was mixed and subjected to distillation. Distillation was carried on slowly, at a bath temperature of 120° C. until the distillate reached the boiling point of 100° C./760 mm. Hg, and the residual dioxane was then separated by distillation. The residue was extracted with ammonia of 1% strength, the extract was acidified and the precipitate was filtered with suction. By recrystallization from a mixture of ethanol and water, 15 g. of product melting at 108° C. were obtained.

EXAMPLE 2

N-(4-ω-chloroethyl-benzenesulfonyl)-N-cyclohexyl-urea 6.9 g. of 4-ω-chloroethyl-benzenesulfonyl-urea (prepared from 4-ω-chloroethyl-benzenesulfonamide and potassium cyanate, melting point 181° C.) and 60 ml. of toluene, 1.75 g. of glacial acetic acid and 3 g. of cyclohexylamine were heated for 2 hours at 115° C. After the solution had cooled, it was shaken with ammonia having a strength of 1%, the ammoniacal solution was acidified with 2 N acetic acid and the crystals that had precipitated were separated by filtration. Recrystallization from ethanol gave 4.5 g. of product having a melting point of 125° C. In the same manner, there was prepared N-(4-ω-chloroethyl-benzenesulfonyl)-N'-cycloheptyl-urea (melting point 116–117° C., from a mixture of ethanol and water) from 10 g. of 4-ω-chloroethyl-benzenesulfonyl-urea, 85 ml. of toluene, 2.4 ml. of glacial acetic acid and 4.7 g. of cycloheptylamine.

EXAMPLE 3

N-(4-ω-chloroethyl-benzenesulfonyl)-N'-4'-isopropyl-cyclohexyl-urea 15 g. of 4-ω-chloroethyl-benzenesulfonamide (prepared by chlorosulfonation of 4-ω-chloroethyl-benzene and following treatment of the sulfochloride with ammonia, melting point 173° C.) were dissolved in a mixture of 34 ml. of 2 N NaOH, 70 ml. of acetone and 32 ml. of water and to this mixture were added dropwise, at 0–5° C., while stirring, 14.4 g. of p-isopropyl-cyclohexyl-isocyanate (prepared from p-isopropylcyclohexylamine and phosgene, melting point 99–101° C. under a pressure of 16 mm. Hg). After completion of the dropwise addition, 70 ml. of acetone having a strength of 50% were added and the whole was stirred for 2 hours without ice-cooling. The acetone was then eliminated by distillation under reduced pressure at room temperature and the residue was dissolved in cold methanol. Upon careful addition of water, trituration and standing, white crystals having a melting point of 154–155° C. were obtained.

In similar manner there was prepared N-(4ω-chloroethyl-benzenesulfonyl)-N'-4'-methyl-cyclohexyl-urea (melting point 119° C., from ethanol and water) from 16.2 g. of 4-ω-chloroethyl-benzenesulfonamide, 17 ml. of 2 N NaOH, 16 ml. of water, 42 ml. of acetone and 13.5 g. of 4'-methyl-cyclohexyl-isocyanate.

EXAMPLE 4

N-(4-ω-chloroethyl-benzenesulfonyl)-N'-cyclooctyl-urea 11.2 g. of 4-ω-chloroethyl-benzenesulfonamide were dissolved in 25 ml. of 2 N NaOH and 50 ml. of acetone. 6.9 g. (=7.1 ml.) of cyclooctyl-isocyanate were added dropwise, at 0–5° C., in the course of half an hour, to this solution. The whole was then stirred for 3 hours and the temperature of the solution was allowed to rise to room temperature by withdrawing the ice-bath. After acidification with binormal hydrochloric acid, the acetone was removed by distillation, the residue was treated with a small amount of aqueous ethanol and allowed to stand until the mass, which at the beginning was syrupy, crystallized. The crystals were separated by filtration with suction and extracted with ammonia having a strength of 1%. After acidification with binormal hydrochloric acid, the crystals were separated by filtration and recrystallized from a mixture of ethanol and water. Melting point 127° C.

EXAMPLE 5

N-[4-chloromethyl-benzenesulfonyl]-N'-cyclooctyl-urea 10.3 g. of 4-chloromethyl-benzenesulfonamide were dissolved in 50 ml. of sodium hydroxide solution and 50 ml. of acetone and to the mixture were added dropwise, at 5° C., while stirring, 7.7 g. of cyclooctyl-isocyanate. The whole was stirred for 1 hour, combined with 200 ml. of water, filtered and the filtrate was acidified with dilute hydrochloric acid. The N-(4-chloromethyl-benzenesulfonyl)-N'-cyclooctyl-urea, which at first had the form of an oil, crystallized soon and was purified by two recrystallizations from a small amount of methanol. Melting point 140–142° C.

EXAMPLE 6

N-(4-ω-chloroethyl-benzenesulfonyl)-N'-cyclohexyl-urea 14 g. of cyclohexyl-urea were heated slowly in an excess of oxalyl chloride until dissolution. The excess of oxalyl chloride was eliminated by distillation under reduced pressure and each time 20 ml. of benzene were added twice to the respective residue and the whole was distilled to dryness. As residue, there were obtained 12 g. of 1-cyclohexyl-parabanic acids which, after recrystallization from water, were found to melt at 186° C.

For preparing 1-(4-ω-chloroethyl-benzenesulfonyl)-3-cyclohexyl-parabanic acid, 10 g. of 1-cyclohexyl-parabanic acid, 12 g. of 4-ω-chloroethyl-benzenesulfonyl chloride (melting point 48° C.) and 5 g. of triethylamine were heated for 2 hours under reflux in benzene. The precipitated triethylamine hydrochloride was filtered off with suction and the benzene was eliminated by distillation under reduced pressure at room temperature. The white crystalline residue was recrystallized from a mixture of chloroform and petrol ether with the addition of charcoal and was found to melt at 198° C. The yield was 12.5 g.

For conversion into N-(4-ω-chloroethyl-benzenesulfonyl)-N'-cyclohexyl-urea, 1 g. of 1-(4-ω-chloroethyl-benzenesulfonyl)-3-cyclohexyl-parabanic acid was heated with 20 ml. of sodium hydroxide for 3 minutes at 60° C. The substance was thereby dissolved. The solution was cooled and the sulfonyl-urea was precipitated by means of binormal hydrochloric acid. The precipitate was treated with ammonia of 1% strength and the solution was combined with 2 N HCl until a precipitate formed. The precipitate obtained (0.8 g.=90%) was found to melt, after recrystallization in a mixture of ethanol and water, at 125° C. and was found to be identical, in the infrared spectrum, with a substance prepared by another method. The mixed melting point of both substances showed no depression.

EXAMPLE 7

N-(4-ω-chloropropyl-benzenesulfonyl)-N'-cyclohexyl-urea 11.9 g. of 4-ω-chloropropyl-benzenesulfonamide (prepared by chlorosulfonation of ω-chloropropylbenzene and following treatment of the sulfochloride with ammonia; melting point 80–82° C.) were dissolved in a mixture of 25 ml. of 2 N NaOH and 51 ml. of acetone and to this solution were added dropwise, at 0–5° C., while stirring, 6.5 g. of cyclohexyl-isocyanate. The whole was then stirred for 2 hours and in the meanwhile the temperature was allowed to rise to 20° C. The solution was acidified with binormal hydrochloric acid, whereby the sulfonyl-urea was separated in the form of an oil. The crude product was dissolved in ammonia of 1% strength, treated with charcoal and acidified. The colorless oil thus obtained crystallized slowly upon standing in an ice-box. After renewed dissolution in cold methanol and following precipitation by means of water, the product obtained was found to have a melting point of 138–140° C.

EXAMPLE 8

N-(4-ω-bromoethyl-benzenesulfonyl)-N'-cyclooctyl-urea 13.2 g. of 4-ω-bromoethyl-benzenesulfonamide (prepared from ω-bromoethylbenzene by chlorosulfonation and treatment of the sulfochloride with ammonia; melting point 175° C.) were dissolved in a mixture of 25 ml. water, 150 ml. of acetone and 25 ml. of 2 N sodium hydroxide and to this solution were added dropwise, at 0–5° C., while stirring, 9 ml. of cyclooctyl-isocyanate. The solution was stirred for 2 hours and the temperature was in the meantime allowed to rise to 20° C. The solution was then acidified and the acetone was removed under reduced pressure at room temperature. The residue was triturated in a mortar with ammonia of 1% strength, stirred for 1 hour and filtered with suction to separate it from undissolved starting material. The ammoniacal filtrate was acidified with acetic acid and the residue was recrystallized from a mixture of ethanol and water. Melting point 125° C.

In the same manner, there was obtained N-(4-ω-bromoethyl-benzenesulfonyl)-N'-4'-isopropyl-cyclohexyl-urea (melting point 156° C., from a mixture of ethanol and water) from 15 g. of 4-ω-bromoethyl-benzenesulfonamide, 27 ml. of water, 29 ml. of 2 N NaOH, 60 ml. of acetone and 12 g. of 4-isopropyl-cyclohexyl-isocyanate.

EXAMPLE 9

N-(4-ω-bromoethyl-benzenesulfonyl)-N'-cyclohexyl-urea 10.2 g. of 4-ω-bromoethyl-benzenesulfonyl-urea (prepared from 4-ω-bromoethyl-benzenesulfonamide and potassium cyanate, melting point 164–166° C.) and 80 ml. of toluene, 2.2 g. of glacial acetic acid and 3.8 g. of cyclohexylamine were kept weakly boiling for 2 hours. After cooling, the solution was shaken with ammonia of 1% strength, the ammoniacal phase was treated with charcoal and acidified with glacial acetic acid. The crystals that had precipitated were recrystallized from ethanol and were found to melt at 162° C.

EXAMPLE 10

N-[4-ω-chloroethyl-benzenesulfonyl]-N'-cyclohexyl-urea 1 g. of N-[4-ω-chloroethyl-benzenesulfonyl]-N'-cyclohexyl-thiourea (prepared by stirring for 18 hours 4-ω-chloroethyl-benzenesulfonamide with cyclohexyl mustard oil in aqueous alkaline acetone at room temperature, melting point 136° C.) was dissolved in 18 ml. of acetone and combined, while stirring, at room temperature with a solution of 300 mg. of sodium nitrite in 1.6 ml. of water. The solution was cooled to 2–5° C., 3 ml. of acetic acid having a strength of 30% were slowly and dropwise added and the whole was stirred for about 3 hours at 5–10° C. The precipitated sulfur was filtered off with suction and the solution was evaporated to dryness at room temperature. The residue was washed with a small amount of water and recrystallized from ethanol with addition of a small amount of water. 780 mg. (80%), melting point 125° C. The mixed melting point with N-[4-ω-chloroethyl-benzenesulfonyl] - N' - cyclohexyl-urea, prepared by the differing method of Example 5, showed no depression. The infrared spectrums of both substances were found to be identical.

We claim:
1. A compound selected from the group consisting of
(A) a benzene-sulfonyl-urea of the formula

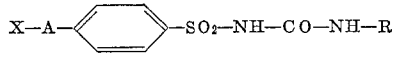

in which

X is a member selected from the group consisting of chlorine and bromine,
A is an alkylene radical of from 1 to 3 carbon atoms,
R is a member selected from the group consisting of cycloalkyl of from 5 to 8 carbon atoms, cyclohexyl being substituted by an alkyl group of from 1 to 3 carbon atoms and cyclohexylalkyl having from 1 to 2 carbon atoms in the alkylene chain, and (B) a pharmaceutically acceptable basic salt thereof.
2. N - (4 - ω - chloroethyl-benzene-sulfonyl)-N'-cyclopentylurea.
3. N-(4-ω-chloroethyl-benzene-sulfonyl)-N'-cyclohexyl-urea.
4. N - (4 - ω-chloroethyl-benzene-sulfonyl)-N'-cycloheptyl-urea.
5. N - (4 - ω - chloroethyl - benzene-sulfonyl)-N'-(4'-isopropyl-cyclohexyl)-urea.
6. N - (4 - ω - chloroethyl-benzene-sulfonyl)-N'-(4'-methyl-cyclohexyl)-urea.
7. N - (4 - ω - chloropropyl - benzene - sulfonyl)-N'-cyclohexyl-urea.
8. N - (4 - ω-bromoethyl-benzene-sulfonyl)-N'-cyclooctyl-urea.
9. N - (4 - ω-bromoethyl-benzene-sulfonyl)-N'-(4-isopropylcyclohexyl)-urea.
10. N - (4 - ω-bromoethyl-benzene-sulfonyl)-N'-cyclohexyl-urea.

References Cited

UNITED STATES PATENTS

| | | | |
|---|---|---|---|
| 3,281,412 | 10/1966 | Yale et al. | 260—239 |
| 3,069,466 | 12/1962 | Pautlitscke | 260—553 |
| 3,102,120 | 8/1963 | Breuer et al. | 260—553 XR |

OTHER REFERENCES

Hayman et al.: J. Pharm Pharmacol., vol. 16, pp. 538–548 (August 1964).

JOHN D. RANDOLPH, *Primary Examiner.*

U.S. Cl. X.R.

260—309.5, 470, 545, 556; 424—321